United States Patent
Nicholes et al.

(10) Patent No.: US 7,146,493 B2
(45) Date of Patent: Dec. 5, 2006

(54) SYSTEMS AND METHODS FOR PROTECTING ADVANCED CONFIGURATION AND POWER INTERFACE CODE FROM DRIVER ATTACHMENT

(75) Inventors: Martin O. Nicholes, Antelope, CA (US); Shiraz Ali Qureshi, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 427 days.

(21) Appl. No.: 10/461,667

(22) Filed: Jun. 13, 2003

(65) Prior Publication Data

US 2004/0255306 A1 Dec. 16, 2004

(51) Int. Cl.
*G06F 15/177* (2006.01)
(52) U.S. Cl. .................. 713/1; 713/2; 710/8; 707/1; 707/100
(58) Field of Classification Search .................. None
See application file for complete search history.

(56) References Cited

U.S. PATENT DOCUMENTS

| 5,809,329 | A | * | 9/1998 | Lichtman et al. | ............... 710/8 |
| 5,903,894 | A | * | 5/1999 | Reneris | ...................... 707/100 |
| 6,185,677 | B1 | * | 2/2001 | Nijhawan | ........................ 713/2 |
| 6,763,454 | B1 | * | 7/2004 | Wilson et al. | .................. 713/1 |
| 2002/0169899 | A1 | * | 11/2002 | Oshins et al. | ................... 710/8 |
| 2004/0030876 | A1 | * | 2/2004 | Qureshi et al. | ................ 713/1 |
| 2004/0243534 | A1 | * | 12/2004 | Culter et al. | .................... 707/1 |

OTHER PUBLICATIONS

U.S. Utility Patent Application entitled "Systems and Methods for Building Advanced Configuration and Power Interface Namespaces,".
U.S. Utility Patent Application entitled "Systems and Methods for Using Secondary System Description Tables,".

* cited by examiner

*Primary Examiner*—Thuan N. Du
*Assistant Examiner*—Fahmida Rahman

(57) ABSTRACT

Methods for using advanced configuration and power interface (ACPI) namespaces are provided. One such method comprises: providing an ACPI namespace that includes a first ACPI functional routine and a device tree lacking at least the first ACPI functional routine; and preventing a driver from being associated with the first ACPI functional routine. Systems also are provided.

9 Claims, 5 Drawing Sheets

SYSTEMS AND METHODS FOR PROTECTING ADVANCED CONFIGURATION AND POWER INTERFACE CODE FROM DRIVER ATTACHMENT

BACKGROUND

The advanced configuration and power interface (ACPI) describes industry standard interfaces for computer systems. In particular, ACPI involves the use of operating systems for directing configuration and power management of such computer systems.

Computer systems employing ACPI perform configuration and power management functions using ACPI code. Specifically, ACPI code is used to determine platform-specific information regarding the particular hardware and/or software, for example, of such a computer system. Once the configuration of the computer system has been determined, the ACPI code manages the power requirements of the various devices of the computer system.

ACPI code is stored in a portion of memory of a computer system known as ACPI namespace. An operating system of a computer system typically writes ACPI code into the ACPI namespace as a device tree, which identifies each of the devices of the computer system and associated functional routines for the identified devices.

In operation, the operating system evaluates the device tree to identify the devices of the computer system. Once a device is identified, the operating system attempts to associate or "attach" a driver to the device so that the device can operate properly.

SUMMARY

Systems and methods for using advanced configuration and power interface (ACPI) namespaces are provided. An embodiment of such a method comprises: providing an ACPI namespace that includes a first ACPI functional routine and a device tree lacking at least the first ACPI functional routine; and preventing a driver from being associated with the first ACPI functional routine.

An embodiment of a system for using an ACPI namespace comprises: an ACPI system operative to access information corresponding to a differentiated system description table (DSDT) and a secondary system description table (SSDT) and to build a library and a device tree, the library including at least a first ACPI functional routine, the device tree lacking at least the first ACPI functional routine, the ACPI system being further operative to prevent a driver from being associated with the library.

An embodiment of a computer-readable medium having a computer program for using an ACPI namespace comprises: logic configured to provide the ACPI namespace with a first ACPI functional routine and a device tree lacking at least the first ACPI functional routine; and logic configured to prevent a driver from being associated with the first ACPI functional routine.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

DETAILED DESCRIPTION

Figure 1:
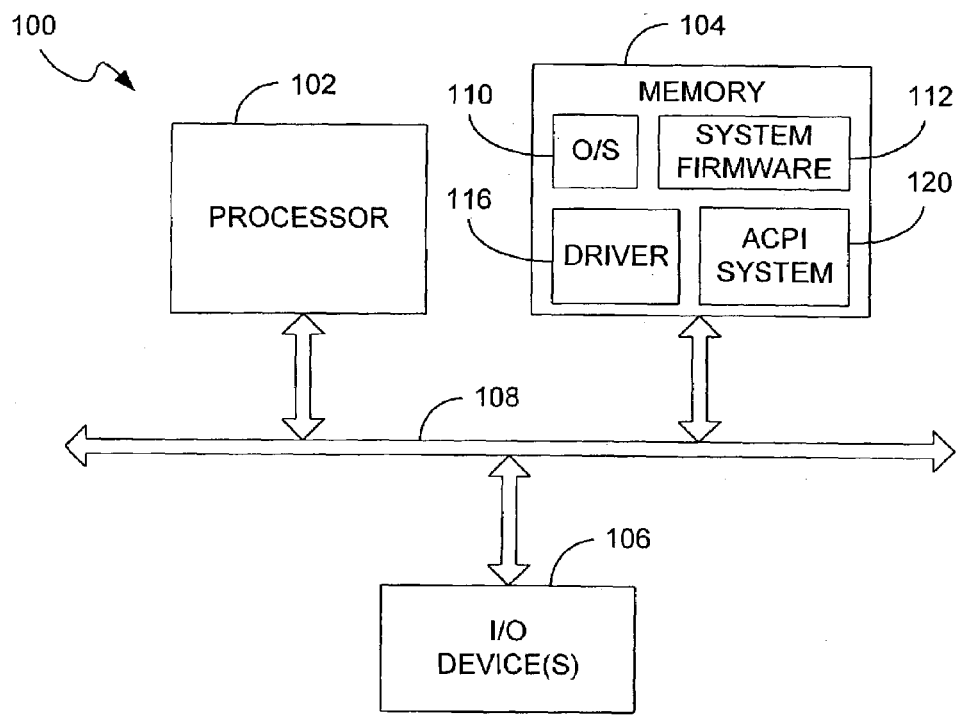
FIG. 1 is a schematic diagram depicting a computer or processor-based system that can be used to implement an embodiment of an advanced configuration and power interface (ACPI) system.

Systems and methods, such as the several embodiments described herein, involve the use of advanced configuration and power interface (ACPI) code that includes device trees and separate libraries of routines that include functionality associated with the device trees. Typically, a single library can support the functionality required of multiple device trees and, thus, can be device independent. For instance, a single library can be constructed for use with multiple device configurations and associated device trees, potentially resulting in economy of ACPI code design. Additionally or alternatively, a functional routine of a library can be used by multiple devices of a computer system so that multiple instances of the functional routine need not be included in the ACPI code as is typically done in the prior art.

Of particular interest is the interaction of an operating system with the ACPI code. Specifically, operating systems typically operate under the assumption that any code located in that portion of memory known as ACPI namespace is associated with one or more devices, e.g., hardware devices. Typically, this assumption is valid as an operating system evaluates the ACPI namespace and then associates an appropriate driver with each identified device located within the ACPI namespace. However, when ACPI code is used that includes a device tree and a separate library, which includes ACPI functional routines, allowing an operating system to attempt to associate a driver with the library can be problematic. Specifically, since such a library of ACPI functional routines is written into the ACPI namespace of a computer system, the operating system of the computer system typically assumes that the library is a hardware device. Thereafter, the operating system attempts to attach a driver to the library. For example, an operator of the computer system could be prompted to identify a driver for use with the identified library. Clearly, the library does not need to be associated with a driver. As will be described in greater detail with respect to several exemplary embodiments, the systems and methods described prevent drivers from attempting attachment to the libraries of ACPI namespaces.

The aforementioned functionality may generally be attributed to an ACPI system that is implemented by a computer or processor-based device. An embodiment of an ACPI system is depicted schematically in FIG. 1, which will be described in detail later. Embodiments of ACPI systems can be implemented in software, firmware, hardware, or combinations thereof. When implemented in hardware, embodiments of ACPI systems can be implemented with any or a combination of various technologies. By way of example, the following technologies, which are each well known in the art, can be used: a discrete logic circuit(s) having logic gates for implementing logic functions upon data signals, an application specific integrated circuit(s) (ASIC) having appropriate combinational logic gates, a programmable gate array(s) (PGA), and a field programmable gate array(s) (FPGA).

When implemented in software, it should be noted that embodiments of an ACPI system can be stored on a computer-readable medium for use by or in connection with a computer-related system or method. In the context of this document, a computer-readable medium is an electronic, magnetic, optical, or other physical device or means that can contain or store a computer program for use by or in connection with a computer-related system or method. Such an ACPI system can be embodied in a computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a "computer-readable medium" can be any means that can store, communicate, propagate or transport a program for use by or in connection with an instruction execution system, apparatus, or device. Thus, a computer-readable medium can be, for example but not limited to, an electronic, magnetic, optical, electromagnetic, infrared, or semiconductor system, apparatus, device, or propagation medium. More specific examples (a nonexhaustive list) of a computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program could be electronically captured, via optical scanning of the paper or other medium, then compiled, interpreted or otherwise processed in a suitable manner, if necessary, and then stored in a computer memory.

When implemented in software, an ACPI system can include a program that is executable by a digital computer, an example of which is depicted schematically in FIG. 1. In FIG. 1, computer 100 includes a processor 102, memory 104, and one or more input and/or output (I/O) devices 106 (or peripherals) that are communicatively coupled via a local interface 108.

Processor 102 can be a hardware device configured to execute software that can be stored in memory 104. Memory 104 can include any combination of volatile memory elements and/or nonvolatile memory elements. Note that memory 104 can have a distributed architecture, where various components are situated remote from one another, but can be accessed by processor 102.

The I/O device(s) 106 can include input devices such as a keypad, output devices such as a display device and/or devices that are configured to communicate both inputs and outputs such as a communication interface.

The memory 104 can include one or more separate programs, each of which comprises an ordered listing of executable instructions for implementing logical functions. Specifically, the memory 104 includes an operating system (O/S) 110, system firmware 112, and one or more drivers 116. The system firmware initializes and tests hardware at startup, starts the O/S and supports the transfer of data among the hardware devices. Typically, the system firmware is stored in ROM so that the system firmware 112 can be executed when the computer system is activated. The driver(s) 116 is used to control devices, such as I/O device(s) 106.

Also shown in memory 104 of FIG. 1 is an embodiment of an ACPI system 120. As shown in greater detail in FIG. 2, ACPI system 120 includes a differentiated system description table (DSDT) 210 and may include one or more secondary system description tables (SSDT). The DSDT and the SSDT(s) provide instructions that enable the O/S 110 to build the ACPI namespace 230, as well as the underlying functionality required for ACPI operation. Typically, the DSDT 210 and accompanying SSDT(s) 220 are loaded into main memory by the system firmware 112. The O/S 110 then analyzes the DSDT 210 and any accompanying SSDT(s) 220 written into main memory and builds the ACPI namespace 230 in accordance with the instructions.

Figure 3:
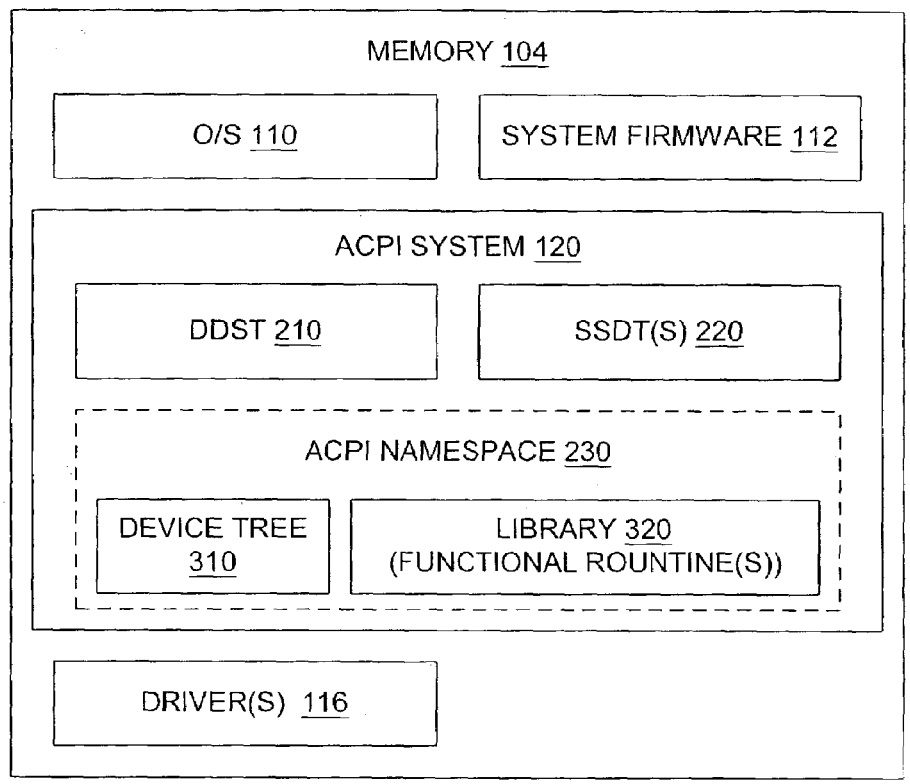
FIG. 3 is a schematic diagram depicting the memory of FIGS. 1 and 2 after construction of the ACPI namespace.

As shown in the schematic diagram of FIG. 3, ACPI system 120 includes a device tree 310 and a library 320. The library 320 includes one or more routines, each of which provides functionality, e.g., ACPI functionality, that can be accessed by the device tree 310. Specifically, the O/S 110 builds that portion of memory 104 designated as the ACPI namespace 230 by interacting with the device tree 310. As will be described in greater detail later, the device tree 310 directs the O/S 110 to access various routines of the library 320 so that device-specific information can be provided to an appropriate location of the ACPI namespace 230.

Figure 2:
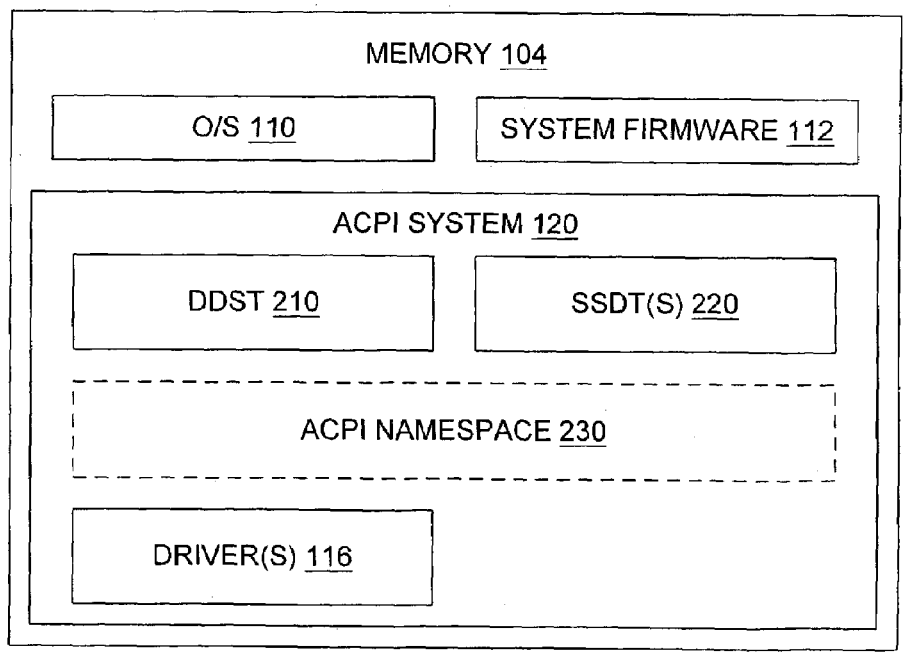
FIG. 2 is a schematic diagram depicting the memory of the system of FIG. 1.

Reference will now be made to the flowchart of FIG. 4, which depicts the functionality of the ACPI system 120 of FIGS. 1 and 2. In this regard, each block of the flowchart represents a module segment or portion of code that comprises one or more executable instructions for implementing the specified logical function(s). It should also be noted that, in some alternative implementations, the functions noted in various blocks of the flowcharts of this disclosure may occur out of the order in which they are depicted. For example, two blocks shown in succession may, in fact, be executed substantially concurrently. In other embodiments, the blocks may sometimes be executed in the reverse order depending upon the functionality involved.

Figure 4:
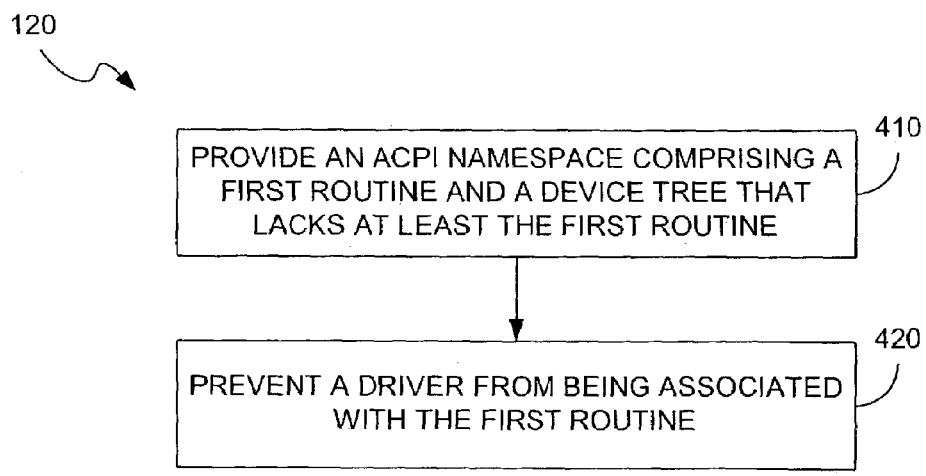
FIG. 4 is a flowchart depicting functionality of an embodiment of an ACPI system.

As shown in FIG. 4, the functionality (or method) may be construed as beginning at block 410, where an ACPI namespace that includes a first ACPI functional routine and a device tree lacking at least the first ACPI functional routine is provided. In block 420, a driver is prevented from being associated with the first ACPI functional routine. Specifically, since the first ACPI functional routine typically is one of several functional routines included in an ACPI library, the operating system of the computer system with which the ACPI namespace is associated is prevented from attaching a driver to the library.

Figure 5:
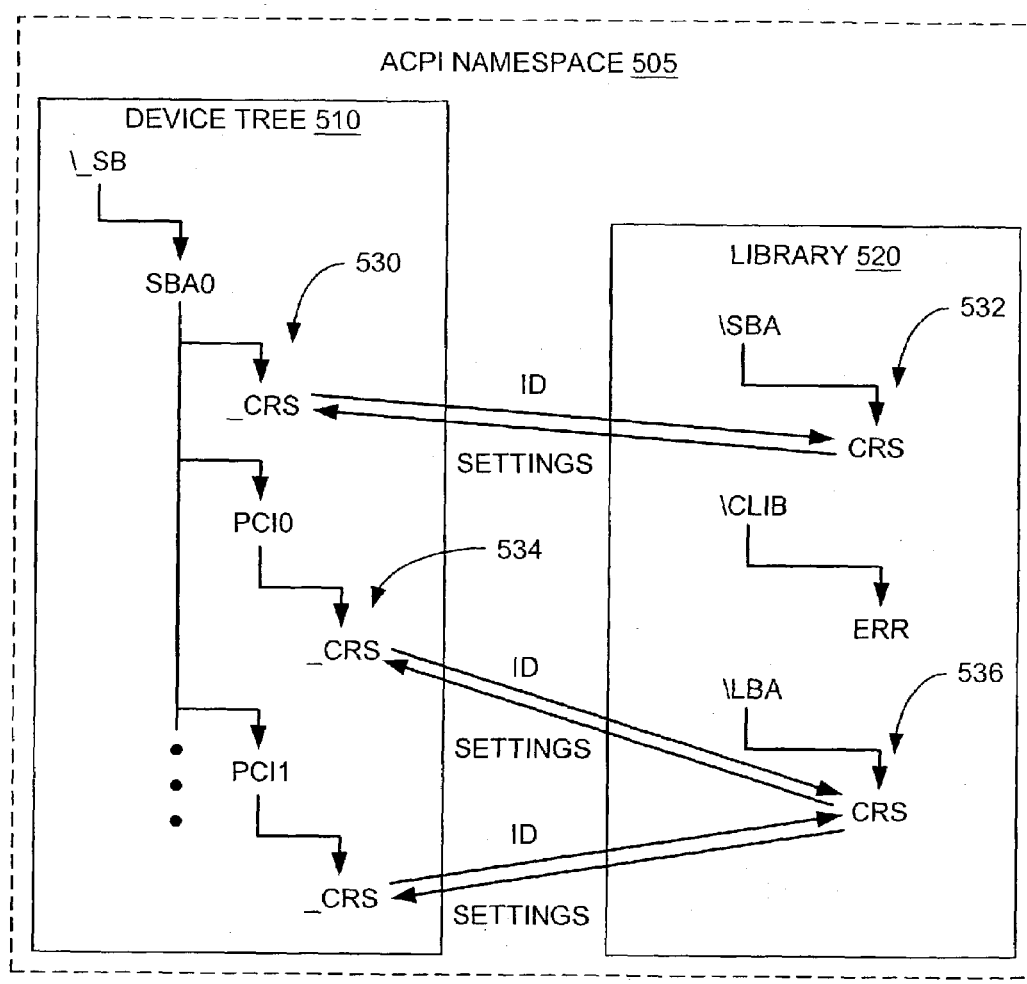
FIG. 5 is a schematic diagram depicting an embodiment of an ACPI namespace and interaction of a device tree and library of that namespace.

An embodiment of another ACPI system is depicted schematically in FIG. 5. As shown in FIG. 5, the ACPI namespace 505 of such an embodiment includes a device tree 510 and a library 520. Device tree 510 is a relatively simplistic code structure that describes the configuration of the computer system (not shown) with which the device tree is associated. In the portion of the device tree depicted, a system bus _SB is provided. The system bus _SB includes a system root bridge SBA0, as well as links to related devices and/or objects. Specifically, SBA0 includes a _CRS object, and system PCI host bridges, PCI0 and PCI1. Note, each of the system PCI host bridges includes a link to a corresponding_CRS object.

Library 520 is depicted as including multiple library routines, each of which includes functionality for a corresponding object of the device tree 510. Specifically, library 520 includes routines that can return information about objects in the device tree 510. In operation, an operating system builds ACPI namespace (not shown) which contains the device tree 510 and the library 520.

For example, the \SBA.CRS routine 532 returns information about the current resources settings of the particular calling object in the device tree. The calling object passes an identification number to the library routine to specify the particular object. In the case that \_SB.SBA0._CRS 530 is called in the device tree, that code calls the library routine \SBA.CRS 532, passing the caller's identification number. The library routine determines the correct values and then returns the values. Thus, the library routine CRS 532 provides functionality that enables settings of the system root bridge SBA0 to be determined and provided for use in the ACPI namespace. Note, the calls to library routines from the device tree typically are hard-coded direct calls. In some embodiments, indirect calls could be used. For example, a look-up table could be used.

Similarly, when the operating system identifies the entry point associated with _CRS 534 of system PCI host bridge PCI0, the associated library routine CRS 536 is called. This includes passing a unique device ID to CRS 536 so that CRS 536 can return the corresponding device settings for PCI0. Note that the CRS function associated with PCI1 also uses library routine CRS 536. Thus, multiple devices of the device tree 510 utilize the same portion of ACPI code of the library 520 for providing the required functionality. Because of this, multiple instances of code may not need to be provided within a library for use with similar devices.

Another example is the \CLIB.ERR library routine that can be called from locations in the code where an error needs to be handled. This allows centralized error-handling in the ACPI library and device tree. In this way, an error code can be passed to the central routing for logging.

Note, various functional objects other than _CRS can be used. By way of example, other objects such as _STA, _HID and _PRT, can be used. Specifically, _STA is an object that returns the status of a device, e.g., whether the device is present or not present. _HID is an object that provides the Plug-and-Play hardware ID of a device. _PRT is an object that describes the PCI interrupt routing in use under a PCI bridge device.

Figure 6:
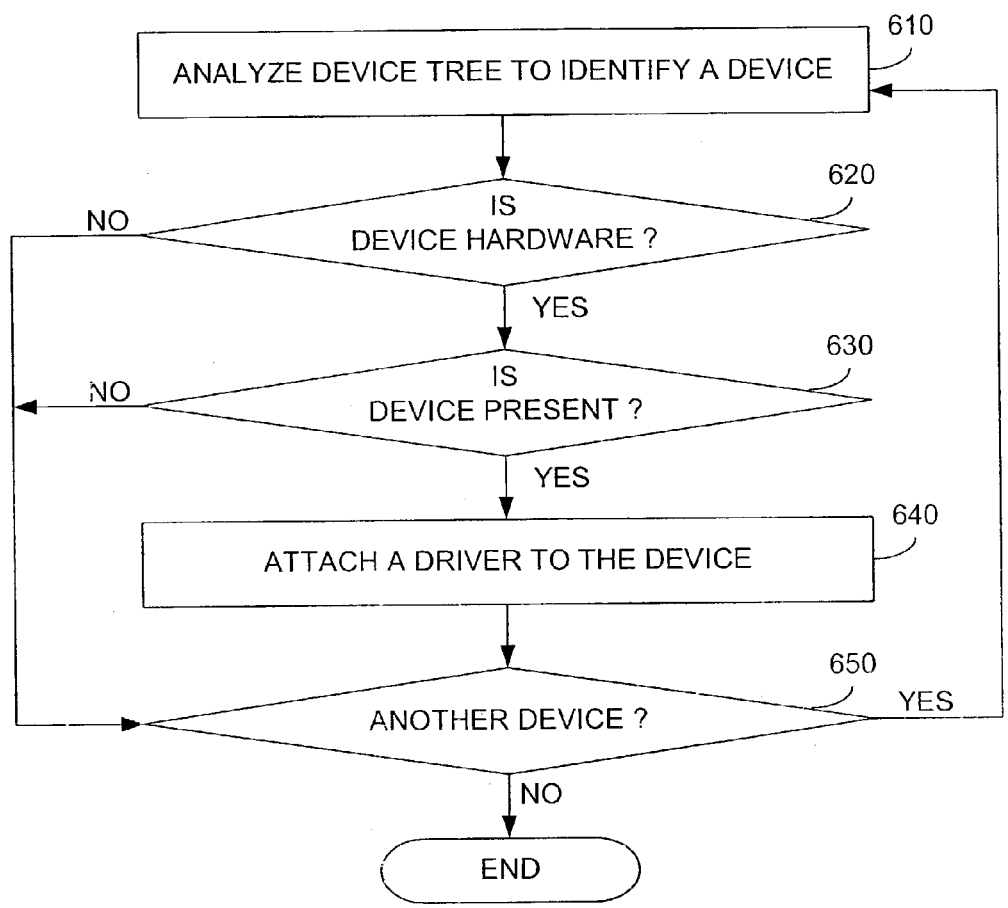
FIG. 6 is a flowchart depicting functionality of another embodiment of an ACPI system.

When using an embodiment of an ACPI system, a computer or processor-based device can exhibit the functionality depicted in FIG. 6. As shown in FIG. 6, the functionality (or method) may be construed as beginning at block 610, where a device tree of such a computer or processor-based device is evaluated to identify a first device. In block 620, a determination is made as to whether the identified device is a hardware device. If it is determined that the device is a hardware device, the process proceeds to block 630 where another determination is made. Specifically, a determination is made as to whether the identified device is present, i.e., physically associated with the computer system and enabled. If it is determined that the identified device is present, a driver is associated with the device, such as by the operating system attaching a driver to the device as depicted in block 640. In block 650, a determination is made as to whether there is another device of the computer system. If there is another device, the process may return to block 610 and proceed as described before. Otherwise, the process may end. Note, the aforementioned process also may end if a determination was made in block 620 that the identified device is not a hardware device or if, in block 630, the identified device is not present.

Figure 7:
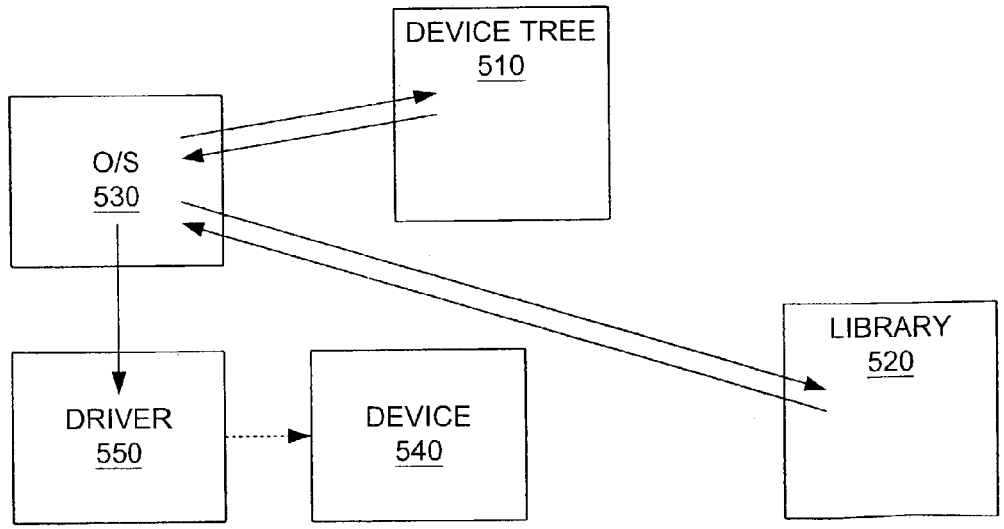
FIG. 7 is a schematic diagram depicting interaction of an operating system with a device tree and an associated library resulting in a driver being attached to a device.

An example of the functionality described with respect to FIG. 6 is depicted schematically in FIG. 7. As shown in FIG. 7, operating system 530 evaluates device tree 510 in order to determine the presence of devices. Specifically, the operating system (O/S) 530 analyzes the device tree 510 for devices that typically require the use of a corresponding driver. As mentioned before, typical operating systems assume that devices associated with an ACPI namespace are hardware devices which require the use of such drivers.

In analyzing device tree 510, the (O/S) 530 queries the device tree to determine whether a device exists. Any device-type object in the device tree (including library objects) that is discovered by the O/S is evaluated to determine if the associated device needs a driver. In FIG. 7, this is accomplished by (O/S) 530 calling the _STA routine associated with the identified device. Note, the _STA routine of the device 540 is contained in the library 520. In response to the call, library 520 provides information to the O/S so that the O/S recognizes the device 540 as being present. Typically, this is accomplished by returning a "1." Additionally or alternatively, identification information can be returned, such as information from the _HID and/or _CID objects (not shown) of device 540. These objects provide the hardware plug-and-play identification and compatibility identification, respectively, of device 540, either of which can be used in assigning a driver. Based upon receipt of the information, O/S 530 is able to assign an appropriate driver, e.g., driver 550, to device 540.

Figure 8:
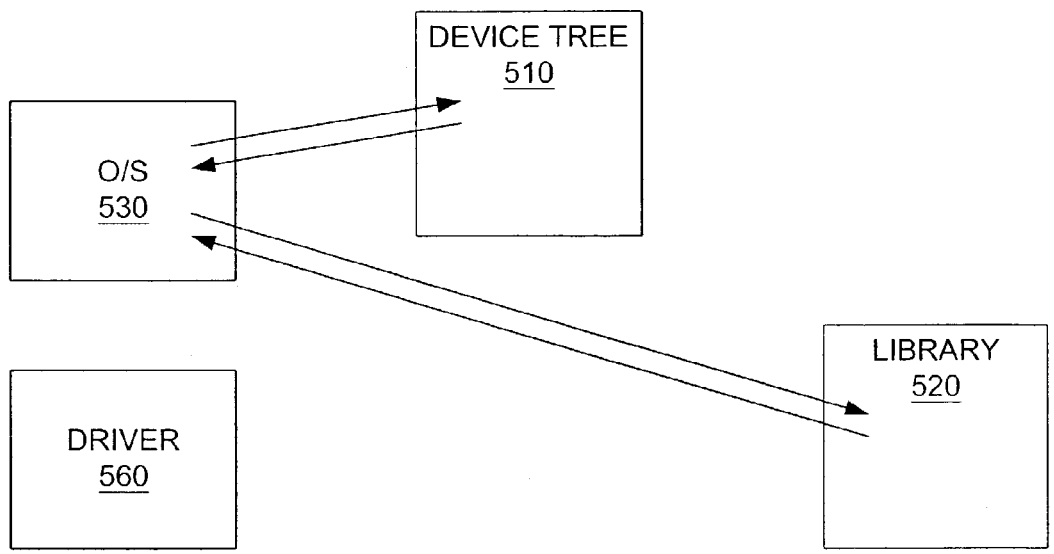
FIG. 8 is a schematic diagram depicting interaction of an operating system with a device tree and an associated library resulting in a driver not being attached to the library.

FIG. 8 schematically depicts the operating system, device tree and library of the system of FIG. 7, in which the operating system continues to evaluate the device tree to identify devices. Specifically, in FIG. 8, O/S 530 evaluates the device tree 510 and has determined the existence of another device, in this case, library 520. In response to the call from O/S 530 to the _STA routine of the library, the _STA routine of the library responds with information that indicates that the library (in this case, the assumed device) is not present. Based upon receipt of this information, the O/S 530 does not attempt to assign a driver 560 to the library.

Figure 9:
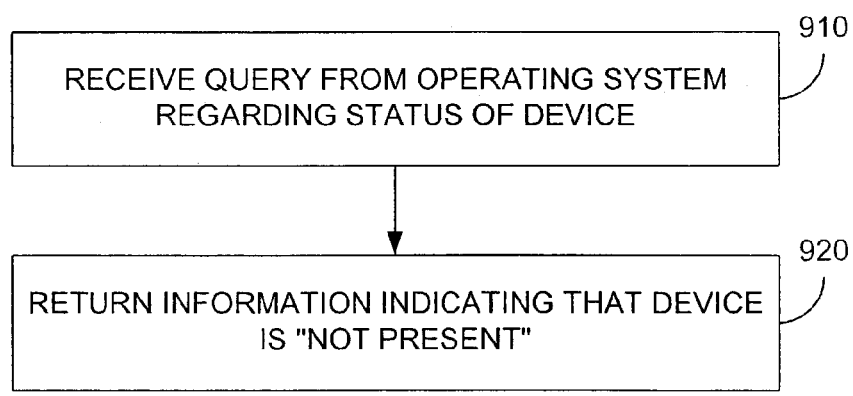
FIG. 9 is a flowchart depicting functionality of another embodiment of an ACPI system.

The functionality associated with the embodiment of FIG. 8 is summarized with reference to the flowchart of FIG. 9. As shown in FIG. 9, the functionality (or method) may be construed as beginning at block 910, where information corresponding to a status query is received from an operating system. In block 920, information indicating that a device is "not present" is returned to the operating system. Such a response should prevent the operating system from attempting to attach a driver to the library.

It should be emphasized that many variations and modifications may be made to the above-described embodiments. All such modifications and variations are intended to be included herein within the scope of this disclosure and protected by the following claims.

The invention claimed is:

1. A method for using an advanced configuration and power interface (ACPI) namespace of a computer system, said method comprising:
   providing the ACPI namespace that includes a first ACPI functional routine and a device tree, the device tree lacking any ACPI functional routines, wherein the ACPI namespace further includes a library of routines and the library of routines includes the first ACPI functional routine; and
   preventing a driver from being associated with the first ACPI functional routine;
   wherein preventing a driver from being associated with the first ACPI functional routine comprises enabling the library of routines to respond to a first call such that the operating system does not associate a driver with the library of routines; and
   wherein enabling the library of routines to respond to the first call comprises informing the operating system that the library of routines is not present.

2. The method of claim 1, further comprising:
   evaluating the device tree to identify information corresponding to a first device of the computer system; and
   initiating a second call to the first ACPI functional routine in response to identifying information corresponding to the first device.

3. The method of claim 2, wherein evaluating the device tree comprises:
   evaluating the device tree with an operating system.

4. The method of claim 1, wherein, in informing the operating system that the library of routines is not present, a logic "0" is returned.

5. A system for using an advanced configuration power interface (ACPI) namespace, said system comprising:
   an ACPI system operative to access information corresponding to a differentiated system description table (DSDT) and a secondary system description table (SSDT) and to build a library and a device tree, the library including at least a first ACPI functional routine, the device tree lacking at least the first ACPI functional routine, the ACPI system being further operative to prevent a driver from being associated with the library; and
   a memory storage device, the ACPI system being stored on the memory storage device;
   wherein the memory storage device comprises system firmware and an operating system (O/S);
   wherein the system firmware enables the DSDT and SSDT to be written to the memory storage device and the O/S analyzes the DSDT and the SSDT to build the library and the device tree; and
   wherein, in response to the O/S, the ACPI system is operative to indicate to the O/S that the library is not present such that the O/S does not attempt to attach any driver to the library.

6. The system of claim 5, further comprising:
   means for storing the ACPI system.

7. The system of claim 5, wherein the ACPI system comprises executable instructions; and
   further comprising:
   a processor operative to execute the executable instructions of the ACPI system.

8. A computer-readable electromagnetic storage medium having a computer program for using an advanced configuration and power interface (ACPI) namespace, said computer program comprising:
   logic configured to provide the ACPI namespace with a first ACPI functional routine and a device tree lacking any ACPI functional routines, wherein the ACPI namespace further includes a library of routines that includes the first ACPI functional routine; and
   logic configured to prevent a driver from being associated with the first ACPI functional routine;
   wherein the logic configured to prevent a driver from being associated with the first ACPI functional routine comprises logic configured to enable the library of routines to respond to a first call such that an operating system does not associate any driver with the first ACPI functional routine; and
   wherein the logic configured to enable the library of routines to respond to the first call comprises logic configured to inform the operating system that the library of routines is not present.

9. The computer-readable medium of claim 8, further comprising:
   logic configured to evaluate the device tree; and
   logic configured to enable a second call to the first ACPI functional routine in response to evaluating the device tree.

* * * * *